United States Patent [19]

Snell

[11] Patent Number: 4,483,479

[45] Date of Patent: Nov. 20, 1984

[54] RATIONED HEAT CONTROL SYSTEM

[76] Inventor: Louis W. Snell, 19 Monroe Dr., Poughkeepsie, N.Y. 12601

[21] Appl. No.: 485,714

[22] Filed: Apr. 18, 1983

[51] Int. Cl.³ .............................................. F24D 3/00
[52] U.S. Cl. .................................. 237/8 R; 236/9 A; 237/19
[58] Field of Search .................. 237/8 R, 8 C, 19, 80; 236/9 A; 431/86

[56] References Cited

U.S. PATENT DOCUMENTS

| | | | |
|---|---|---|---|
| 3,917,165 | 11/1975 | Cross | 236/46 |
| 3,929,284 | 12/1975 | Prewarski et al. | 236/46 |
| 3,964,676 | 6/1976 | Rooks et al. | 236/46 |
| 3,995,810 | 12/1976 | Banks | 237/8 |
| 4,002,292 | 1/1977 | Parks | 236/46 |
| 4,060,123 | 11/1977 | Hoffman et al. | 165/11 |
| 4,132,355 | 1/1979 | Cleary et al. | 236/47 |
| 4,319,873 | 4/1979 | Michaud | 431/24 |

OTHER PUBLICATIONS

American Stablis, "Enertrol Installation Manual", 1979.

Primary Examiner—Henry Bennett
Attorney, Agent, or Firm—John Maier, III

[57] ABSTRACT

A rationed heat control system with aquastat and circulator remote pushbutton activation for maintaining heat losses at minimum levels during periods of non-use while providing full heat capacity upon request for a predetermined time period.

10 Claims, 5 Drawing Figures

RATIONED HEAT CONTROL SYSTEM

BACKGROUND OF THE INVENTION

1. Field of the Invention.

The present invention relates to heat control systems. More particularly, the present invention is directed to a system of heat rationing wherein, the boiler fluid temperature is maintained as low as possible during periods when not needed to avoid loss of heat from a higher temperature while providing high temperature fluid upon demand as required.

2. Description of the Prior Art.

With the increasing cost of energy, various ways with which to conserve heating fuel have been proposed. Programming to most efficiently use warm up and cool down periods for controlling buildings has been taught. Most frequently, the concepts have been directly to control the temperature within one or more rooms more efficiently but not to limiting the heat loss through the operation of the heating system itself.

Modern home central heating systems react to each zone thermostat call for heat by opening a zone valve to permit the transfer of fluid. The zone valve requests burner start to generate supporting heat, and circulator start for rapid response. The burner will operate until the thermostat is satisfied or the high-limit aquastat is exceeded. Energy conservation depends on efficient thermostat programming of the occupant's life style.

Conservation has also been proposed by varying the boiler temperature high-limit inversely with outdoor temperature. Such a technique does not consider the source heat requirement difference to support occupied or unoccupied zone areas, or the occupant human factor considerations of activity (deskwork vs housework), health (normal or sick) or unscheduled lifestyle (2 A.M. child care, late sleep in, or temperature history whether foundation and building material has stored heat or frost).

During summer, domestic hot water systems commonly use a low-limit aquastat to maintain a domestic hot water source of 140° F. to satisfy most domestic needs. Conservation techniques include various programmed timers to turn off the system during non use. The resulting cold water encourages condensation, rust and deterioration, as well as forcing preprogrammed lifestyles.

The novel features which are considered as characteristic of the invention are set forth with particularity in the appending claims. The invention itself, however, as to its construction and obvious advantages, will best be understood from the following description of the specific embodiment when read with the accompanying drawings.

SUMMARY OF THE INVENTION

The present invention overcomes the disadvantages of the prior art and in so doing provides a reliable, durable and dependable heat-saving system. The rationed heat control system includes a low-limit aquastat and a high-limit aquastat which operate independently of one another. During periods of only a limited need for heat the temperature of the boiler fluid stays at the temperature setting of the low-limit aquastat. Upon demand from a switch means, preferably remotely located from the boiler in a particular heat zone, the high-limit aquastat is placed in a dependent relationship so tht the boiler fluid will increase to the temperature setting of the high-limit aquastat. A timer is utilized automatically to terminate the dependent relationship so that at the end of a preset time period, the boiler fluid temperature will revert to the temperature setting of the low-limit aquastat.

The prior art functions of high-limit aquastat, circulator pump, and thermostat are transferred to occupant control by the invention rationed heat controller and remote initiator pushbuttons. Unless requested, the domestic hot water boiler temperature is maintained at a non rust minimium and the thermostat heat requests are supported by low temperature heating fluid circulated by conduction.

The occupant can select when, and for how long, to generate hot domestic hot water, and to control room heating zones at temperatures below, equal to, or above the individual thermostat settings. The rationed heat controller permits extension of, or early termination of each support function, as well as automatic reset to the low temperature mode upon completion of the rationed time cycle.

DESCRIPTION OF THE DRAWINGS

The present invention may be better understood and its numerous advantages will become apparent to those skilled in the art by reference to the accompanying drawings wherein like reference numerals refer to like elements in the various figures in which.

DESCRIPTION OF PREFERRED EMBODIMENT

General Description

Figure 1:
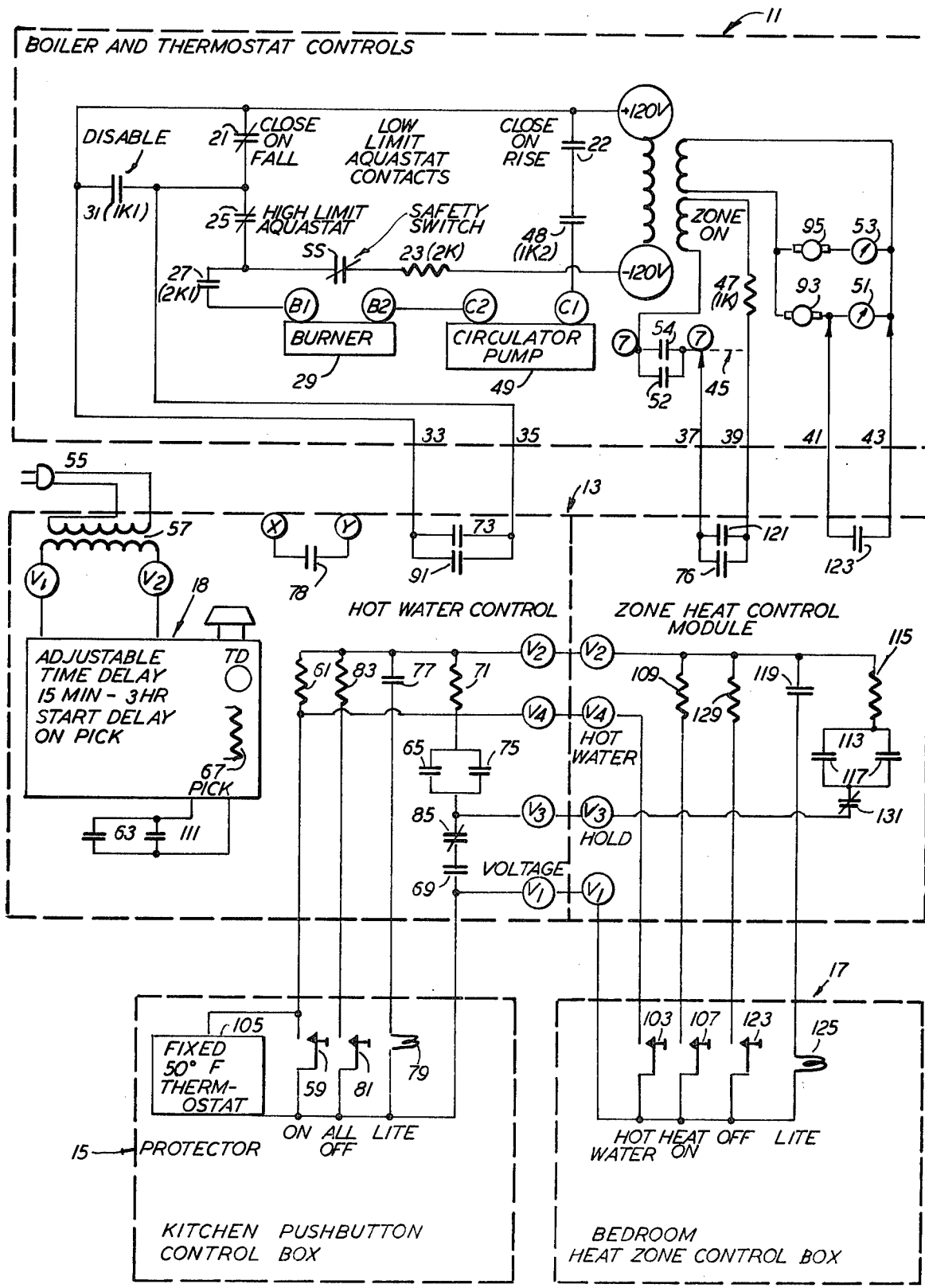
FIG. 1 is a schematic view of the rationed heat control system adapted for use in a home.
Figure 2:
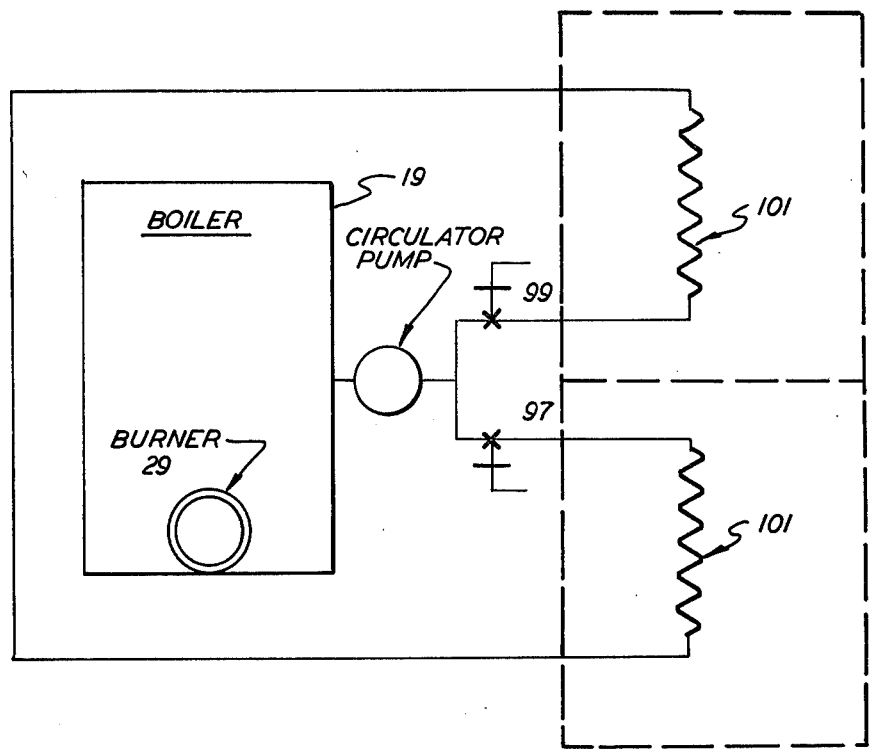
FIG. 2 is a schematic of a two-zone boiler fluid installation with one circulator as is known in the prior art.
Figure 3:
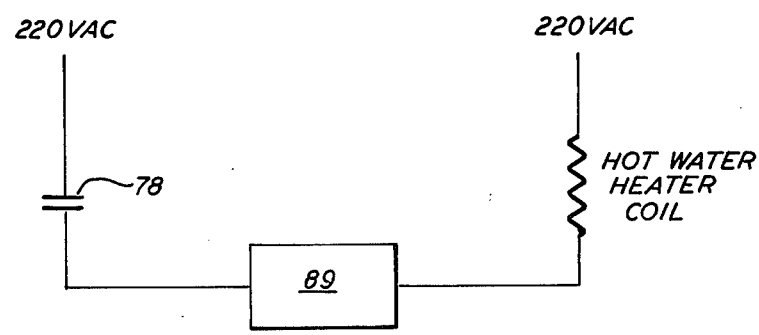
FIG. 3 is a schematic of a variation of the schematic view shown in FIG. 1 when used with an independent domestic hot water unit.

The circuitry for a rationed heat control system for use in a home or similar application is shown in FIG. 1 using a hot water heating system. FIG. 1 includes various sections, namely the boiler and thermostat controls 11, control circuit 13, a kitchen remote control box 15 and a bedroom remote control box 17.

The Rationed Heat Control System relies on the use of a timer 18, which is adjustable and features the maintenance of a reduced water temperature in the boiler 19 when the building is unoccupied and when seasonal conditions permit use of a reduced boiler water temperature. Except when the premises are occupied and a request is made for a higher boiler water temperature, the hot water or other fluid used in the heating system is maintained at the lowest possible level so that the constant loss of heat from radiation from the system is substantially reduced during periods of no demand. Normally, an aquastat setting selected for the boiler water temperature operates within a ten (10) degrees variation.

Without the rationed heat control system and referring now to FIG. 1 and more specifically to the Boiler and Thermostat Controls 11, when the boiler fluid temperature drops 10° F. below the preselected low-limit aquastat setting, the low-limit aquastat 21 closes thereby energizing a relay 23. The circuit is completed, through the high-limit aquastat 25 which is normally closed, to the relay 23 which closes a contact 27 which starts a burner 29 thereby heating the fluid in the boiler 19. When the temperature of the fluid in boiler 19 rises to the low-limit aquastat setting, the low-limit aquastat 21 opens, thereby deenergizing the relay 23 which deactivates the burner 29 by opening contact 27, thus maintaining a constant temperature setting for the low-limit aquastat 21 for the domestic hot water supply.

When the wall thermostat 51, 53 requests heat, relay 47 closes contact 31 and contact 48. By closing contact 31, the low-limit aquastat 21 is bypassed and the boiler fluid is heated until either the thermostats 51, 53 are satisfied or the boiler fluid temperature reaches its preset upper limit and the high-limit aquastat 25 opens. When the boiler temperature lowers to 10 degrees below the setting of the high-limit aquastat 25, and the thermostats 51, 53 continue to request heat, contact 25 closes which activates burner 29 through contact 31, maintaining the boiler fluid at the temperature setting of the high-limit aquastat 25 so as to satisfy the thermostats 51, 53.

INSTALLATION

The installation of the rationed heat control system to an existing hot water system for use in a home or similar building requires the following steps:

1. Disable the contact 31 so that the high-limit aquastat 25 does not respond to thermostat request for heat. In this way, the temperature of the fluid in the boiler 19 will be maintained within the ten degree variation of the low-limit aquastat 21.

2. Wires 33, 35, 37, 39, 41 and 43 need to be connected as shown in FIG. 1. One existing wire 45 (shown dotted) connected to a relay 47 will not respond to requests from the wall thermostats 51, 53.

3. The control circuit 13 (FIG. 1) is connected to standard house current of 120 Volts AC at a plug 55.

4. A kitchen remote control box 15 is placed in a convenient location in the kitchen of a house and the bedroom remote control box 17 is placed in a convenient location in the bedroom, preferably within easy reach of the bed. It is to be understood that kitchen and bedroom are used by way of example and a first and second room, area or zone would be as appropriate.

5. The timer 18 (FIG. 1) is adjusted to satisfy the average timer situation desired. A one-hour setting for summer and two hours for winter has been found to be most preferable.

6. The low-limit aquastat 21 and the high-limit aquastat 25 are adjusted for optimum settings based upon personal preference and the season. Settings of 100° F. on the low-limit aquastat 21 and 150° F. for the high-limit aquastat 25 for summer and 120° F. for the low-limit aquastat 21 and 180° F. for the high-limit aquastat 25 for winter are considered desirable. Without a rationed heat control system, the usual recommended settings are 130° F. and 180° F. respectively all year around.

DOMESTIC HOT WATER

Summer Season

It is common practice for homeowners to set the boiler water temperature to an average temperature of 130° F. to satisfy domestic hot water demand. This is accomplished by setting the low-limit aquastat 21 to 130° F., permitting boiler temperature to vary between 120° F. and 130° F. However, even so, during non-use periods, the boiler maintains 130° F. water with substantial heat losses. However, despite such heat losses, an inadequate water temperature of 120° F. is sometimes all that is available for such functions as dishwashing. The rationed heat control system both overcomes much of the remaining heat loss and also overcomes the lack of a sufficient water temperature.

The low standby water temperature feature of the rationed heat control system permits setting the low-limit aquastat 21 at 100° F. This temperature setting supplies just a sufficient water temperature to keep the boiler from sweating and rusting during periods of non-use. The high-limit aquastat 25 is set at 150° F. so that upon demand, a domestic hot water supply of 140°–150° F. is available for the preset rationed time period. The kitchen remote control box 15 operates on 24 Volt AC current produced from the housecurrent through a step-down transformer 57 also shown in FIG. 1.

When 150° F. hot water is desired, an on-button 59 in the kitchen remote control box 15 is closed and a relay 61 is energized closing the contact 63 and the contact 65. Closing the contact 63 starts the timer which energizes relay 67 and closes the contact 69. With the contact 65 and the contact 69 both closed, a relay 71 is energized. The relay 71 is an "on function" relay. The relay 71 being energized, closes contact 73, contact 75, contact 77, contact 78 and contact 76. Contacts 78 and 76 apply to functions described in other sections.

The contact 73 when closed, actuates the relay 23 thereby closing the contact 27 which energizes the burner 29 as has been previously explained. The contact 75, when closed, locks the circuit closed, assuring continued operation of the relay 71 despite the opening of the on-button 59 in the kitchen remote control box 15. The close contact 77 illuminates a light 79 located in the kitchen remote control box 15 to indicate that the "on function" is in operation.

An occupant can prematurely terminate the cycle of the "on function" by pressing the all-off button 81 in the kitchen remote control box 15. The closing of the off-button 81 actuates a relay 83 thereby opening a contact 85 which is normally closed and thereby deenergizes the relay 71. Button 81 is called "all-off" because it also deactivates the hold circuits of all other rationed heat control functions. If not terminated by the occupant pressing the off-button 81, the timer 18 will ultimately deenergizes the relay 67 when the preset time period for the timer 18 has been completed. With the relay 67 deenergized, the contact 69 will open, thereby deactivating everything started by the closing of the on-button 59 in the same manner that the opening of contact 85 by closing the off-button 81 terminates everything started.

SEPARATE HOT WATER APPLICATION

The area of the rationed heat control system just described under the heading "Domestic Hot Water—Summer Season" can also be applied to a separate hot water heater. A contact 78 actuated by the relay 71 is connected in series with the high temperature thermostat control 89 for the separate hot water heater whether it is heated with gas, electric or oil. In addition, the contact 73 must, in summer, be disabled so as to isolate the hot water heater from the heating system.

HEAT WHEN UNOCCUPIED

Winter Season

During periods of vacancy, or when outdoor temperatures are moderate, heating can be satisfied by the low-limit aquastat 21 set at 120° F. When any thermostat 51, 53 calls for heat, zone motors 93, 95 respectively are energized opening zone valves 97, 99 respectively and the 120° F. water circulates by convection. Heat is supplied to the rooms, as is well-known, through radiation 101 located in the respective rooms or sections. The activated zone motors 93, 95 close contacts 52, 54 which in the prior art would energize the relay 47 and start the burner 29 and circulator 49. With this design, removal of the wire 45 prohibits either thermostat 51, 53 from initiating the burner 29 or the circulator 49 as previously explained.

OCCUPIED THERMOSTAT CONTROL

Winter Season

During cold weather, when the building is occupied and the occupant wants all thermostat controlled areas to be at the respective thermostat temperatures, the on push-button 59 at the kitchen remote control box 15 or the hot-water-on push button 103 in the bedroom remote control box is pressed. The functions under "Domestic Hot Water—Summer Season" obtained with the closing of the on-button 59 also pertains to the push-button 103. It should be understood that in place of bedroom and living room any other room designation, such as first and second rooms or first or second sections would be equally as applicable.

During the winter season, high-limit aquastat 25 would be set at 180° F. so that hot water in the boiler 19 would be provided at 180° F. in the same manner as has been previously described for a higher temperature setting under the heading "Domestic Hot Water—Summer Season". The energization of the relay 71 as has previously been explained would close the contact 76. In response to either of the thermostats 51, 53 causing zone valve contacts 52, 54 to close, the relay 47 is energized and the contact 48 closed. The circulator 49 is started. The timer 18 is activated for the preset time period, preferable two hours during which time all thermostats 51, 53 are supported by 180° F. circulated heating fluid. Following the rationed time, the thermostats 51, 53 are supported by heat fluid conduction transfer from the boiler as the heat is dissipated from the 180° F. to the 120° F. level.

MINIMUM TEMPERATURE PROTECTION

Winter Season

Referring specifically to the kitchen remote control box 15 in FIG. 1, there is shown in parallel with on-button 59, a fixed 50° F. thermostat 105. It is conceivable that the occupant may set the low-level aquastat too low, and not provide sufficient heat in very cold weather to maintain an adequate minimum house temperature. Should that situation occur, the 50° F. thermostat 105 will activate the hot water system providing hot water in the system to 180° temperature, which would be the maximum winter high-limit setting, in the same manner as previously described under the heading "Occupied Thermostat Control—Winter Season".

BEDROOM EXTRA HEAT CONTROL

Winter Season

The bedroom area, particularly in the morning, is an area where the occupant wants extra heat. However, this same situation also applies to other areas or sections of commercial and residential buildings at various times of the day. During the evening, bedroom thermostats are frequently kept low but a substantial rise in heat is usually desired when arising. This is also the time when the maximum amount of hot water is normally needed. To achieve this, the heat-on-button 107 in the bedroom remote control box 17 is closed. In this manner, a relay 109 will be energized and the energizing of relay 109 will close contacts 111 and contact 113.

The closing of contact 111 will energize the timer 18 as previously explained and also energizes the relay 67 thereby closing contact 69. The closing of contact 113 and the closing of contact 69 will energize relay 115 thereby closing the contact 91, contact 117, contact 119, contact 121, and contact 123.

The closing of contact 91 immediately starts the burner 29 as has been previously explained. The contact 117 being closed, locks the circuit, thereby maintaining the operation of the circuit notwithstanding the release of the heat-on-button 107 in the bedroom remote control box 17. The closing of the contact 119 turns on a light 125 in the bedroom remote control box 17. The contact 123 being closed immediately turns on the zone control 93, and closes contact 52. Closing contact 52 and, with contact 121 closed, energizes 47 closing contact 48 and turns on the circulator pump to rapidly flow heated fluid through the radiation 101 of the building. The contact 123 bypasses the bedroom thermostat 51 so that the heat will continue to rise notwithstanding the temperature setting of the bedroom thermostat 51. The living room thermostat 53 will also then receive the hot water or fluid but only to the setting of the living room thermostat 53. Thus, upon arising, domestic hot water and a comfortable room temperature are available. Should it be desired to shut off the extra heat function prior to the rationed time, the extra heat function can be stopped at any time by closing an off-button 127 in the bedroom remote control box 17 which energizes a relay 129. The energization of relay 129 will open the normally-closed contact 131 thereby opening the entire circuit previously energized by the closing of the heat-on-button 107 in the bedroom remote control box. Continued comfort is experienced as the stored 180° F. boiler heating fluid is dissipated by conduction in support of zone thermostat requests.

The rationed heat control system performs the functions of (1) requesting hot boiler temperature, (2) starting the circulator, and (3) overriding the thermostat by transferring control from the prior art circuitry to the controller. Control is initiated, extended and terminated by remote switches and is maintained for a rationed time period by an adjustable timer which can be restarted on request.

The invention design disables the prior art contact 31 and connects wires 33 and 35 to attach controller contact 73. When the controller closes contact 73, the burner 29 will operate under control of the high-limit aquastat 25 producing hot domestic water and heating fluid.

The invention design disables the prior art zone on relay 47 circuit 45 and connects wires 37 and 39 to attach controller contact 121. When the controller closes contact 121, a thermostat request can energize relay 47 and close circulator start contact 48.

The invention design connects wires 41 and 43 in parallel with thermostat 51 to attach controller contact 123. When the controller closes contact 123, the thermostat 51 appears to request heat, permitting room temperature control in excess of thermostat setting.

The invention allows each heat zone to be reset prior to timer completion.

Each function initiated indicates continued occupancy so every active function ration time will be extended each time a new function is started.

The invention has a master control to terminate all functions prior to the rationed timer completion.

COMMUNTIY BUILDING HEAT CONTROL

Winter Season

Many community buildings, such as churches and clubs, are constructed with one large meeting hall and numerous small conference rooms or classrooms. To avoid high initial cost, it is necessary that one heating system satisfy both distinctly different heating needs. The small rooms, such as the classrooms or conference rooms, can be easily heated with a boiler water temperature of 140° F. which is an adequately low-temperature to conserve fuel. The meeting room, on the other hand, requires a large source of very hot water so as rapidly to heat the large room but usually this is an infrequent occurrence. However, when rapid heating of the large room is required, the low boiler water setting of 140° F. is not sufficient properly and quickly to heat the large room, which requires a 180° F. boiler fluid source.

In order to find an efficient system which meets both needs, the boiler water temperature is maintained at a base level of 140° F. The large room circulator operates from a two-wire thermostat. The classrooms are heated by multiple zones per classroom circulator and the classroom thermostat and zone valves are the more complex three-wire type.

In the meeting room, a meeting room remote control box 133 (FIG. 4) is located including a 40° F. fixed-temperature thermostat 135 along with an on-button 137, off-button 139 and a light 141. When use of the large meeting room is desired, the on-button 137 is closed, thereby closing a relay 143. Closing the relay 143 closes a contact 145 which turns on a three-hour timer 147 and a relay 149 which closes a contact 151. The relay 143 also closes a contact 153 thereby completing the circuit through the closed contact 153 and the closed contact 151 energizing the relay 157. Relay 157 closes hold contact 155, and contacts 159 and 187. Contact 159 energizes a relay 161 which closes a contact 163. The contact 163 bypasses a low-limit aquastat control 165 set at 140° F. to activate a high-limit aquastat set at 180° F. or higher and keep the boiler fluid at this high temperature for three hours. A meeting room thermostat 167 is set for the desired temperature which should be high enough to close the thermostat 167 and with contact 187, energize a relay 169 to close a contact 171. The contact 171, when closed, turns on a meeting room circulator 179 for the main large meeting room to supply high-temperature boiler fluid to radiation 101 in the large meeting room. The meeting room circulator 179 turns off when the desired temperature set on the meeting room thermostat 167 is reached which opens the meeting room thermostat 167. The relay 157 also closes a contact 181 to turn on the light 141 in the meeting room remote control box 133. All of the sequences initiated by closing the on-button 137 on the meeting room remote control box 133 will automatically terminate at completion of the three hour cycle. They can also be terminated by closing the off-button 139 in the meeting room remote control box 133 which energizes the relay 183 thereby opening a normally-closed contact 185. When the relay 157 is not energized and the contact 187 is open, the meeting room thermostat 167 is disabled but actuation of the meeting room circulator 179 is still possible by closing the contact 171 through the energization of the relay 169 by means of a 55° F. fixed thermostat 189 being closed due to the temperature in the meeting room falling to 55° F. Should the low-limit 140° F. boiler temperature be insufficient to maintain the 55° F, a safety 40° F. thermostat 135 located in the meeting room remote control box 133 will bring about the same result as the closing of the on-button 137 in the meeting room control box 133.

As a supplement to the meeting room remote control box 133, a programmed timer 191 can be used. Such a programmed timer 191 can be used for those times when the large room schedules are reasonably fixed. The programmed timer 191, when heat is scheduled, activates a relay 193 closing a contact 195 and energizes the "on" function relay 157.

CLASSROOM CIRCULATOR CONTROLS

Winter Season

Adaption for the rationed heat control is made by inserting the controller 201 between a motor control 203 and a wall thermostat 205 with three wire connections 207.

The rationed control techniques for classrooms is similar to that previously described. When not in use with the room temperature below 55° F., a thermostat 200 in controller 201 closes, energizing relay 211 with power supplied from the classroom controller 24 volt transformer 213 energized by a wall plug 215. Relay 211 opens contact 217 and closes contact 219. Power from a circulator control transformer 221 through a wire 223, a motor control contactor 225, a wire 227, the contact 219, and wire 229 energizes a zone motor 231 which rotates the control contactor 225 and a valve 233. When rotated, a tab 224 is in line with a wire 235 and energizes a relay 237, closes a contact 239 and actuates classroom circulator 241. When the thermostat 200 is satisfied, contact 209 opens, deenergizing relay 211, closing contact 217 and opening contact 219. The zone motor 231 is again energized by transformer 221 via wire 223, motor contactor control 225, a wire 240 which now is on the motor control contactor 255, contact 217, wire 229, zone motor 231 and the wire 225. The zone motor 231 causes the zone valves 233 to close and rotates the motor control contactor 225 such that tab 224 no longer connects the wire 235, thus deenergizing relay 237, opening contact 239 and stopping the circulator 241. A contact 247 is open, and therefore use of the classroom thermostat 205 is prevented permitting only the low maintenance temperature for the classrooms.

Should a higher temperature, as set on the classroom thermostat 205, be desired, an on-button 249 located in a small room remote control box 251 is closed. In doing so, a relay 253 is closed, closing the contact 255 to begin a timer 257, preferably set for one hour, and also closing a contact 259. The timer 257 closes a contact 261 and that in series with the contact 259 energizes a relay 263 closing a hold contact 265 and the contact 247. When the thermostat 205 calls for heat, the relay 211 is closed, again opening contact 217 and closing contact 219, as previously described. However, in this case, the circulator 241 will continue to operate until the higher thermostat temperature is reached or unless the one hour timer 257 has completed its cycle at which point the contact 261 will open, thereby terminating the operations resulting from the closing of the on-button 249. When the on-button 249 is closed, and the relay 263 closes a contact 267, a small room light 269 located in the small room remote control box 251 will light up. Upon completion of the time period of the timer 257, the small room thermostat 205 is deactivated and control of the temperature in the respective small room will revert back to the thermostat 200 which will operate the zone motor 231 and circulator 241.

Figure 4:
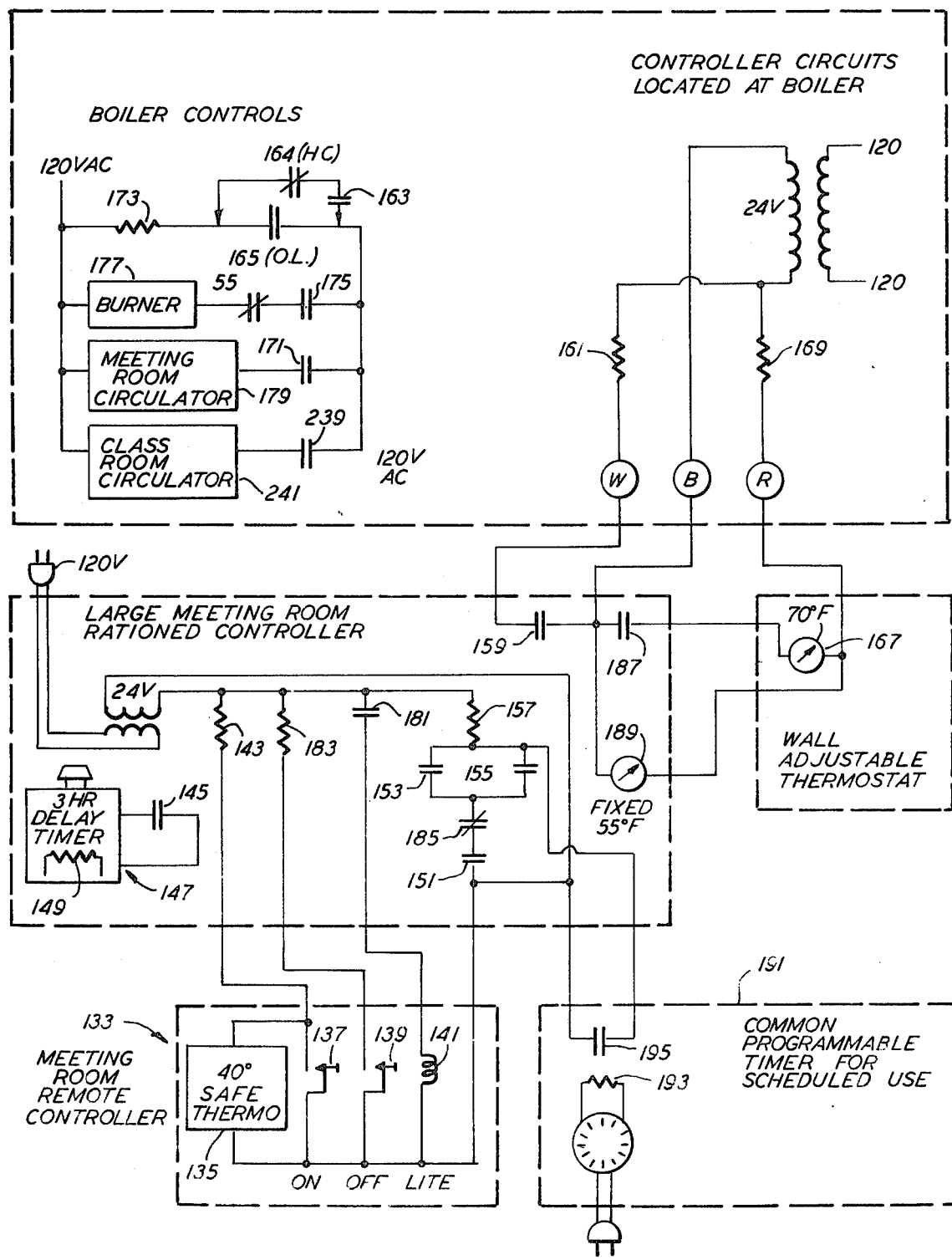
FIG. 4 is a schematic of a variation of the rationed heat control system adapted for use in a community building with a large room and several small rooms showing in particular the control circuitry for the large room.
Figure 5:
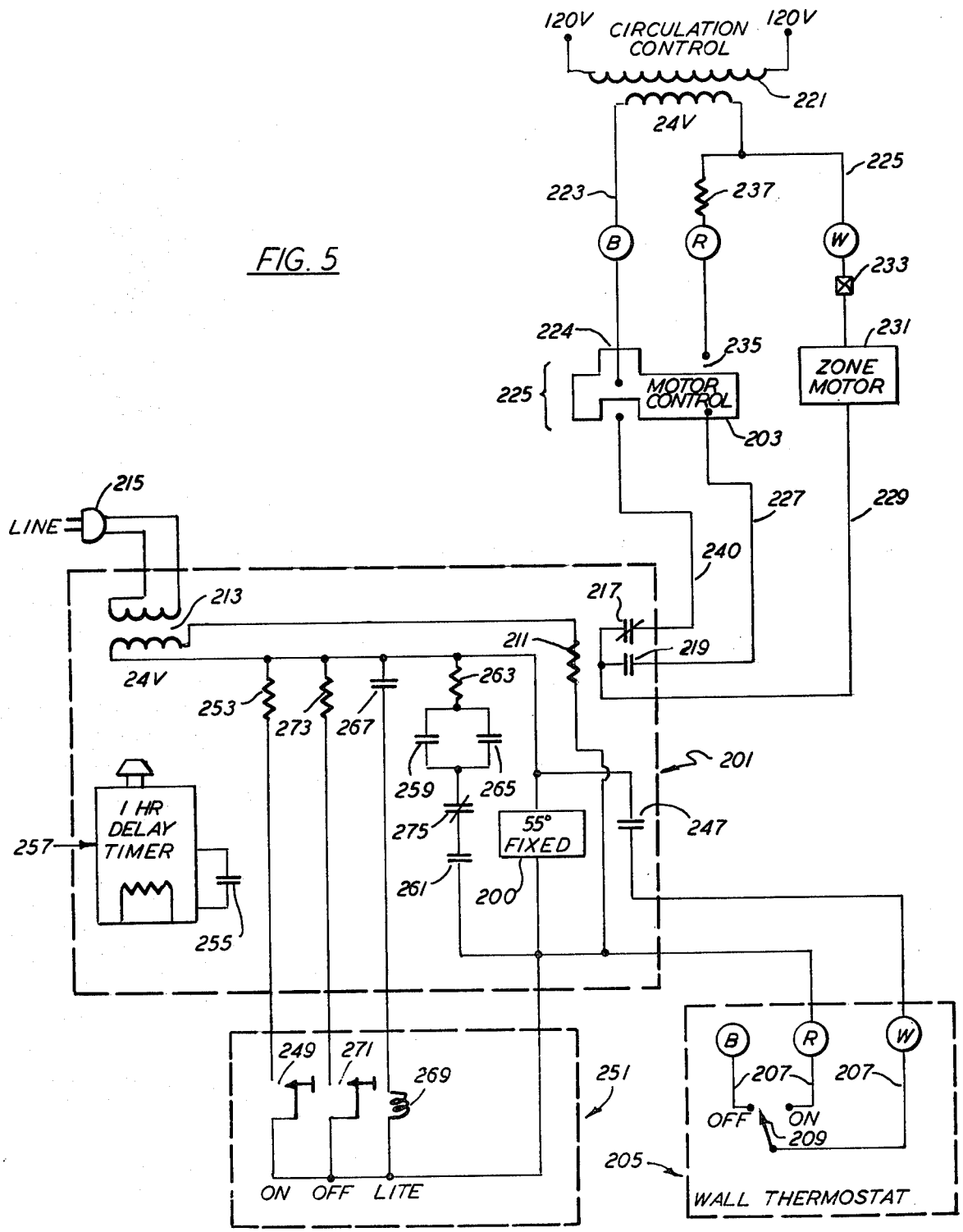
FIG. 5 is a schematic of the same variation in FIG. 4 showing in particular the control circuitry for one of the small room zones.

The heating fluid for the classroom will be 140° F. if used alone, or 180° F. if the large meeting room heat request was initiated (FIG. 4). The individual classroom controller 201 can be terminated early by an off-button 271 energizing relay 273 and opening a hold contact 275.

While a preferred embodiment has been shown and described, various modifications and substitutions may be made without departing from the spirit and scope of this invention. Accordingly, it is understood that this invention has been described by way of illustration rather than limitation. The function may be designed in relays, semiconductor logic, or any other switching technology.

I claim:

1. A rationed hot water control system for use with a heated fluid boiler having a burner and at least one heating zone with a zone valve, said system comprising:
   a low-limit aquastat for maintaining a minimum temperature for the fluid in the boiler, said low-limit aquastat being electrically connected to the burner and being adapted to maintain the fluid temperature in said boiler at a minimum temperature;
   a high-limit aquastat for maintaining a maximum temperature for the fluid in the boiler, said high-limit aquastat being electrically connected to the burner and being adapted to maintain the fluid temperature in said boiler at a maximum temperature;
   a control circuit including a timer and a circuit-closing switch connected to the high-limit aquastat to activate the high-limit aquastat to increase the fluid temperature to the maximum temperature setting of the high-limit aquastat when the circuit-closing switch is activated, the high-limit aquastat being deactivated by the timer concluding its time period, said low-limit aquastat and said high-limit aquastat being connected so that the fluid temperature is controlled by the low-limit aquastat when the circuit-closing switch is inoperative;
   said circuit-closing switch being manually operated and being remotely located from said boiler in said heating zone, said control circuit further including a thermostatically-actuated switch in parallel with the circuit-closing switch to activate the high-limit aquastat whenever the heating zone temperature drops to a preset level; and
   a thermostat and a valve relay, said thermostat being located in said heating zone.

2. A rationed heat control system according to claim 1 wherein said control circuit further includes a first relay, a second relay and a third relay, said first relay energizing said timer and said third relay, said first and third relays energizing said second relay, said second relay energizing said high-limit aquastat, said second and third relays being deenergized when the timer completes its time cycle.

3. A rationed heat control system according to claim 1 wherein said control circuit further includes a circuit-opening switch, a first relay, a second relay, a third relay and a fourth relay, said first relay energizing said timer and said third relay, siad first and third relays energizing said second relay, said second relay energizing said high-limit aquastat, said second and third relays being deenergized when the timer completes its time cycle, said circuit-opening switch energizing said fourth relay to deenergize said second relay before said timer cycle is completed.

4. A rationed heat control system for use with a heated fluid boiler having a burner and a circulator pump and at least two separate heating zones, each heating zone being controlled by a separate zone valve, said system comprising:
   a low-limit aquastat for maintaining a minimum temperature for the fluid in the boiler, the low-limit aquastat being electrically connected to the burner and being adapted to maintain the fluid temperature in said boiler at a minimum temperature;
   a high-limit aquastat for maintaining a maximum temperature for the fluid in the boiler, the high-limit aquastat being electrically connected to the burner and being adapted to maintain the fluid temperature in said boiler at a maximum temperature, the low-limit aquastat and the high-limit aquastat being connected so that the fluid temperature is normally controlled by the low-limit aquastat;
   a thermostat located in each zone, each thermostat being connected to a separate relay to open its respective zone valve; and
   a control circuit including a timer and a separate circuit-closing switch in each zone, each circuit-closing switch being connected to the high-limit aquastat to activate the high-limit aquastat to increase the fluid temperature to the maximum temperature setting of the high-limit aquastat when the circuit-closing switch is closed and also connected to the circulator pump to activate the circulator pump to circulate heated fluid through each open zone valve, said control circuit being connected to at least one of the thermostats to bypass the thermostat to permit the temperature in that zone to exceed the thermostat setting, each of said circuit-closing switches being manually operated and being remotely located from said boiler in one of said heating zones, said control circuit further including a thermostatically-actuated switch in parallel with at least one of the circuit-closing switches to activate the high-limit aquastat whenever the respective zones temperature drops to a preset level.

5. A rationed heat control system according to claim 4 wherein said control circuit further includes a circuit-opening switch, a first relay, a second relay and a third relay, said first relay energizing said timer and the third relay, the first and third relays energizing the second relay, the second relay energizing the high-limit aquastat and the circulator pump and also bypassing at least one thermostat to permit the temperature in that zone to exceed the thermostat setting, the second and third relays being deenergized when the timer completes its time cycle.

6. A rationed heat control system according to claim 4 wherein said control circuit further includes a circuit-opening switch, a first relay, a second relay, a third relay and a fourth relay, said first relay energizing said timer and said third relay, said first and third relays energizing said second relay, said second relay energizing said high-limit aquastat and the circulator pump and also bypassing at least one thermostat to permit the temperature in that zone to exceed the temperature setting, the second and third relays being deenergized when the timer completes its time cycle, the circuit-opening switch energizing the fourth relay to deenergize the second relay before the timer cycle is completed.

7. A rationed heat control system for use with a heated fluid boiler having a burner and a circulator pump and having a first heating zone and a second heating zone, said first heating zone including a first zone valve and a first circulator pump and said second heating zone having a second zone valve and a second circulator pump, said system comprising:

a low-limit aquastat for maintaining a minimum temperature for the fluid in the boiler, said low-limit aquastat being electrically connected to the burner and being adapted to maintain the fluid temperature in said boiler at a minimum temperature;

a high-limit aquastat for maintaining a maximum temperature for the fluid in the boiler, said high-limit aquastat being electrically connected to the burner and being adapted to maintain the fluid temperature in said boiler at a maximum temperature;

a first control circuit including a first timer, a first circuit-closing switch, a first thermostat, a second thermostat and a third thermostat, said first circuit-closing switch and said first, second and third thermostat being located within said first zone, said first thermostat being set at a desired room temperature and said second and third thermostats being set at predetermined temperatures below room temperature with the second thermostat set at a higher temperature than the third thermostat, said first control circuit being adapted to activate said high-limit aquastat when said first circuit-closing switch is closed, said third thermostat being located in parallel with said first circuit-closing switch also to activate said high-limit aquastat when said first circuit-closing switch is open and the temperature within the first zone drops to the predetermined temperature set in the third thermostat, said first control circuit being further adapted to activate said first circulator pump when said first thermostat is closed and said high-limit aquastat has been activated and to actuate said first circulator pump when said second thermostat is closed; and a second control circuit including a second timer, a second circuit-closing switch, a fourth thermostat and a fifth thermostat, said second control circuit being adapted to activate said second circulator pump when said fourth thermostat and said second circuit-closing switch are activated and said second control circuit being further adapted to activate said circulator when said fifth thermostat is activated, said fourth thermostat being set at a desired room temperature and said fifth thermostat being set a predetermined minimum temperature.

8. A rationed heat control system according to claim 7 wherein the first circuit-closing switch activates the first timer, the first thermostat being deactivated at the conclusion of the time period of the first timer.

9. A rationed heat control system according to claim 7 wherein the second circuit-closing switch activates the second timer, the fourth thermostat being deactivated at the conclusion of the time period of the second timer.

10. A rationed heat control system according to claim 7 wherein the first control circuit includes a programmable timer to activate the high-limit aquastat.

* * * * *